United States Patent
Sarajian

(10) Patent No.: US 9,545,123 B2
(45) Date of Patent: Jan. 17, 2017

(54) FOOD TOPPING DISPENSER WITH APPLICATION ROLLER FOR DUSTING FOOD PRODUCTS

(71) Applicant: Axis Automation, LLC, Hartland, WI (US)

(72) Inventor: Tigran K. Sarajian, Oconomowoc, WI (US)

(73) Assignee: Axis Automation LLC, Hartland, WI (US)

( * ) Notice: Subject to any disclaimer, the term of this patent is extended or adjusted under 35 U.S.C. 154(b) by 127 days.

(21) Appl. No.: 14/539,303

(22) Filed: Nov. 12, 2014

(65) Prior Publication Data
US 2015/0128852 A1    May 14, 2015

Related U.S. Application Data

(60) Provisional application No. 61/903,141, filed on Nov. 12, 2013.

(51) Int. Cl.
| | |
|---|---|
| *A23P 1/08* | (2006.01) |
| *B05C 19/00* | (2006.01) |
| *B05C 19/06* | (2006.01) |
| *B05C 19/04* | (2006.01) |
| *A21C 9/04* | (2006.01) |

(52) U.S. Cl.
CPC .................. *A23P 20/12* (2016.08); *A21C 9/04* (2013.01); *B05C 19/00* (2013.01); *B05C 19/008* (2013.01); *B05C 19/04* (2013.01); *B05C 19/06* (2013.01)

(58) Field of Classification Search
CPC ............ A23P 1/082; A21C 9/04; B05C 19/00; B05C 19/008; B05C 19/04; B05C 19/06; B65B 39/00; B65G 65/4827; B65D 88/68; G01F 11/00

USPC .......... 118/13, 304, 308; 141/129, 255, 286; 222/163, 167, 410, 414

See application file for complete search history.

(56) References Cited

U.S. PATENT DOCUMENTS

| | | | |
|---|---|---|---|
| 2,030,541 A * | 2/1936 | Rose ..................... | G01F 13/001 141/131 |
| 2,152,500 A * | 3/1939 | Rasmussen .............. | A21D 8/10 118/24 |
| 3,070,264 A | 12/1962 | Christy | |

(Continued)

OTHER PUBLICATIONS

"The AXIS Duster", AXIS Automation, http://www.axisautomation.com/duster.cfm.

*Primary Examiner* — Laura Edwards
(74) *Attorney, Agent, or Firm* — Andrus Intellectual Property Law, LLP

(57) ABSTRACT

A food topping dispenser includes a hopper having a pair of sidewalls, a back wall and a front wall defining an open unobstructed interior sized to receive a supply of food topping. An application roller is positioned in a discharge opening of the hopper and is rotatably mounted in and between the sidewalls. The application roller has an exterior surface configured to receive and retain the food topping from the discharge opening. A wiper element is mounted on a lower end of the back wall outside the open interior in the discharge opening, and is positioned above the application roller for engagement with the food topping received from the discharge opening. A stripping brush element is mounted on a lower end of the front wall outside the open interior in the discharge opening for engagement with the exterior surface of the application roller for removing food topping retained therein.

20 Claims, 7 Drawing Sheets

(56) References Cited

U.S. PATENT DOCUMENTS

| | | | | |
|---|---|---|---|---|
| 3,659,754 A | * | 5/1972 | Barone | G01F 11/24 |
| | | | | 222/368 |
| 3,788,529 A | | 1/1974 | Christy | |
| 4,595,128 A | | 6/1986 | Fielding | |
| 4,926,583 A | * | 5/1990 | Hamilton | A01C 7/044 |
| | | | | 111/179 |
| 8,444,013 B2 | | 5/2013 | Sarajian | |

* cited by examiner

FOOD TOPPING DISPENSER WITH APPLICATION ROLLER FOR DUSTING FOOD PRODUCTS

CROSS-REFERENCE TO RELATED APPLICATION

The present application is based on and claims priority to U.S. Provisional Patent Application Ser. No. 61/903,141 filed Nov. 12, 2013, the disclosure of which is incorporated herein by reference.

BACKGROUND

The present disclosure relates generally to a device for dispersing or distributing a food topping onto a food product. More specifically, the present disclosure pertains to a food topping dispenser for sprinkling or dusting food topping in a controlled and consistent manner.

Previously, many different food products are topped or dusted with a food topping, such as flour, powdered or granulated sugar or powered cinnamon. Typically, a continuous stream of food products passes beneath a food topping device which continuously dispenses the food topping onto the individual food products. Although various devices currently exist to dispense food toppings onto the stream of food products, these devices are unable to provide a consistent and controlled product flow, dispensing volume and accurate dispensing pattern desired. In addition, known food topping devices require multiple components, including an agitator, which increase production and maintenance cost. Therefore, a need exists for a food topping device which improves upon the dispensing characteristics of known devices, and can be provided with less manufacturing and servicing costs.

SUMMARY

The present disclosure relates to a food topping dispenser for distributing a food topping on a food product. The food topping dispenser includes a hopper including a pair of sidewalls, a back wall and a front wall defining an open unobstructed interior sized to receive a supply of food topping. Lower ends of the back wall and the front wall define a discharge opening. An application roller is positioned in the discharge opening and is rotatably mounted in and between the sidewalls. The application roller has an exterior surface configured to receive and retain the food topping from the discharge opening. A wiper element is mounted on the lower end of the back wall outside the open unobstructed interior and the discharge opening, and is continuously positioned above the application roller for engagement with the food topping received from the discharge opening upon the application roller. A stripping brush element is mounted on a lower end of the front wall outside the open unobstructed interior and the discharge opening for engagement with the exterior surface of the application roller for removing food topping retained therein.

A 90-degree sector of the application roller lies between lower ends of the back wall and the front wall. The back wall and the front wall extend between the sidewalls, and are positioned in suspended relationship spaced from the front and the rear edges of the sidewalls. The back wall has an L-shaped configuration and includes a vertically extending wall portion and a horizontally extending wall portion bent rearwardly from the vertically extending wall portion. The front wall has a forwardly extending lower end, an angled wall portion bent upwardly and forwardly on the forwardly extending lower end, a vertically extending portion joined to the angled wall portion and a forwardly extending upper end bent from the vertically extending portion. The configuration of the front wall and the diameter of the roller allows the food topping device to dispense a food topping, such as flour or powdered sugar, without the need for an agitator positioned within the open hopper.

The present disclosure further relates to a food topping device for dispensing a food topping onto a food product. The food topping device includes a hopper including a pair of sidewalls, a back wall and a front wall sloping inwardly towards and extending beneath the back wall. The sidewalls, the back wall and the front wall define an open unobstructed interior sized to receive a supply of food topping. Lower ends of the back wall and the front wall define a discharge opening. An application roller is positioned in the discharge opening and is rotatably mounted between the sidewalls. The application roller has an exterior surface configured to receive and retain the food topping from the discharge opening. A vertically extending wiper element is mounted on the lower end of the back wall outside the open unobstructed interior and the discharge opening of the hopper, and is engaged with the food topping received from the discharge opening upon the application roller. The wiper element is continuously positioned over the application roller. A stripping brash element is mounted on a lower end of the front wall outside the open unobstructed interior and the discharge opening of the hopper, and is engaged with the exterior surface of the application, roller for removing food topping retained therein.

The front wall has a fixed length which is longer than a fixed length of the back wall. The lower end of the front wall extends beneath the lower end of the back wall. A 90-degree sector of the application roller is located between the lower end of the back wall and the lower end of the front wall. The sidewalls are held spaced apart by a series of tie rods. The back wall has an L-shaped configuration that includes a vertically extending wall portion and a horizontally extending wall portion bent rearwardly from the vertically extending wall portion. The horizontally extending wall portion is supported upon a first tie rod extending between the sidewalls at a rear end thereof. The wiper element is adjustably mounted relative to the application roller on an outer surface of the vertically extending wall portion. The front wall has a forwardly extending lower end, an angled wall portion bent upwardly and rearwardly on the forwardly extending lower end, a vertically extending portion joined to the angled wall portion and a forwardly extending upper end bent from the vertically extending portion. The angled wall portion is bent relative to the forwardly extending lower end at an angle of 60 degrees. The forward extending upper end of the front wall is supported upon a second tie rod extending between the sidewalls at a front end thereof. The stripping brush element is adjustably mounted relative to the application roller on the forwardly extending lower end of the front wall. A volume of the hopper is adjusted by a space filling structure attached inside the hopper. The exterior surface of the application roller is formed with a 14-point full pitch diamond knurled configuration. The sidewalls are positioned on opposite ends of the application roller and are mounted substantially perpendicularly to a support surface for a conveyor arrangement on which the food product is conveyed.

BRIEF DESCRIPTION OF THE DRAWINGS

The drawings illustrate the best mode presently contemplated of carrying out the invention, in the drawings.

DETAILED DESCRIPTION

Figure 1:
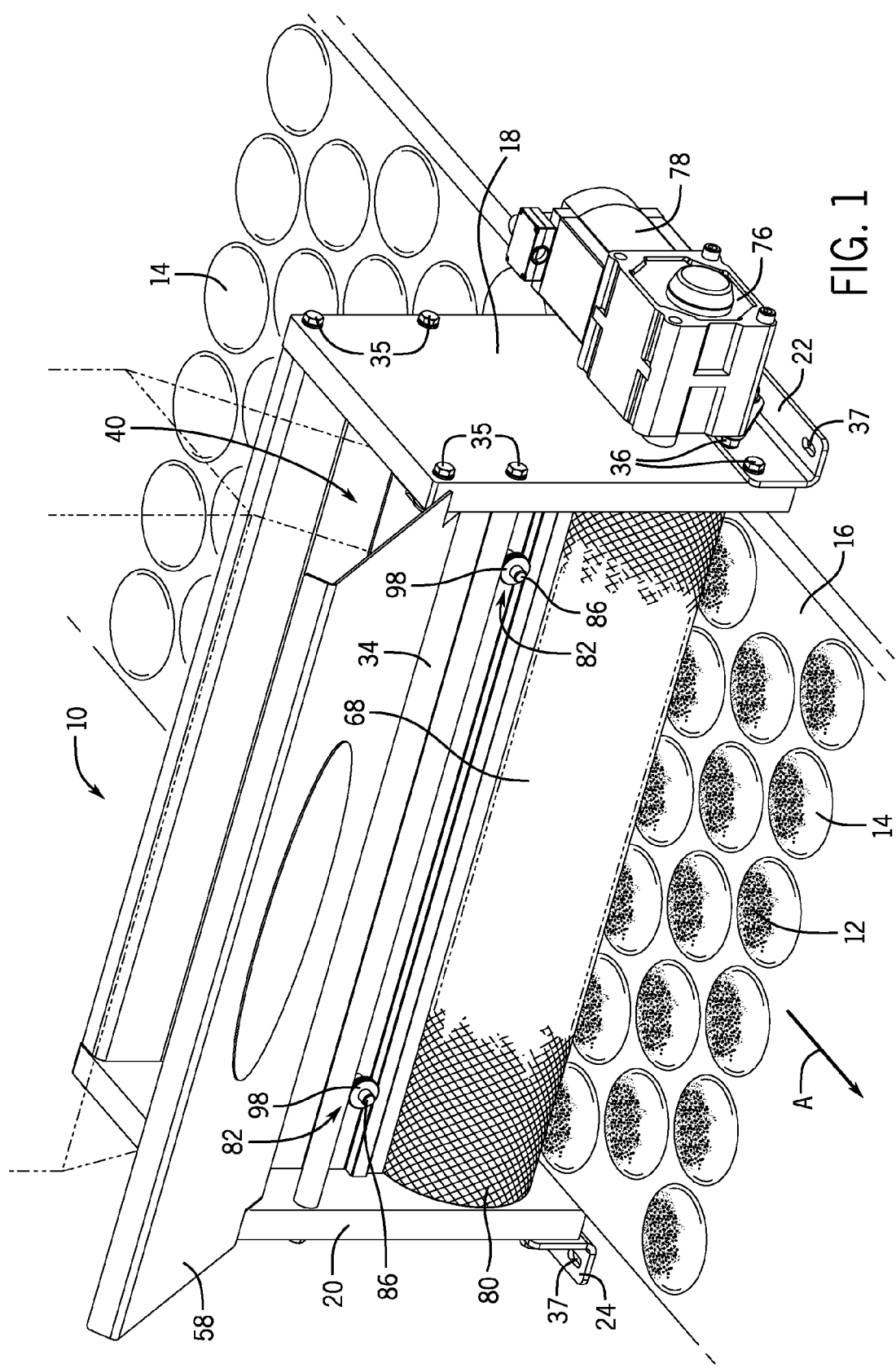
FIG. 1 is a top rear perspective view of a food topping dispenser in accordance with the present disclosure showing the dispenser in operation.
Figure 2:
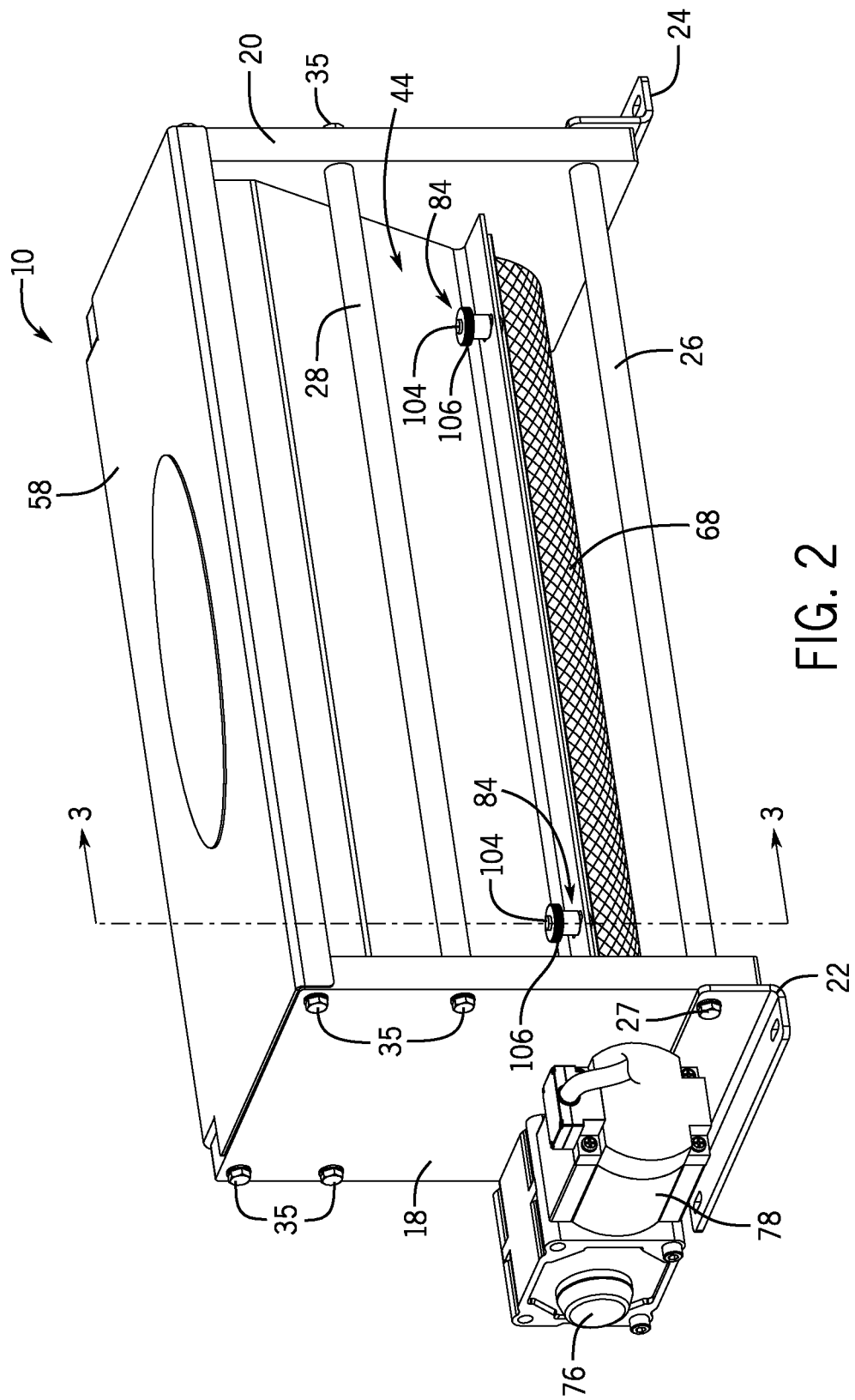
FIG. 2 is a front perspective view of the food topping dispenser shown in FIG. 1.

FIGS. 1 and 2 illustrate a food topping dispenser 10 constructed in accordance with the present disclosure. The food topping dispenser 10 automatically sprinkles or "dusts" a fine, non-viscous granular food topping material 12, such as flour, powered sugar, crystallized sugar, cinnamon powder or a similar topping onto a food product 14 as the food product moves beneath the dispenser 10. The food products 14 can be individual items or a stream of products that move beneath the dispenser 10 in the direction of arrow A in FIG. 1, such as on a moving conveyor surface 16, which is straddled by the dispenser 10.

Figure 3:
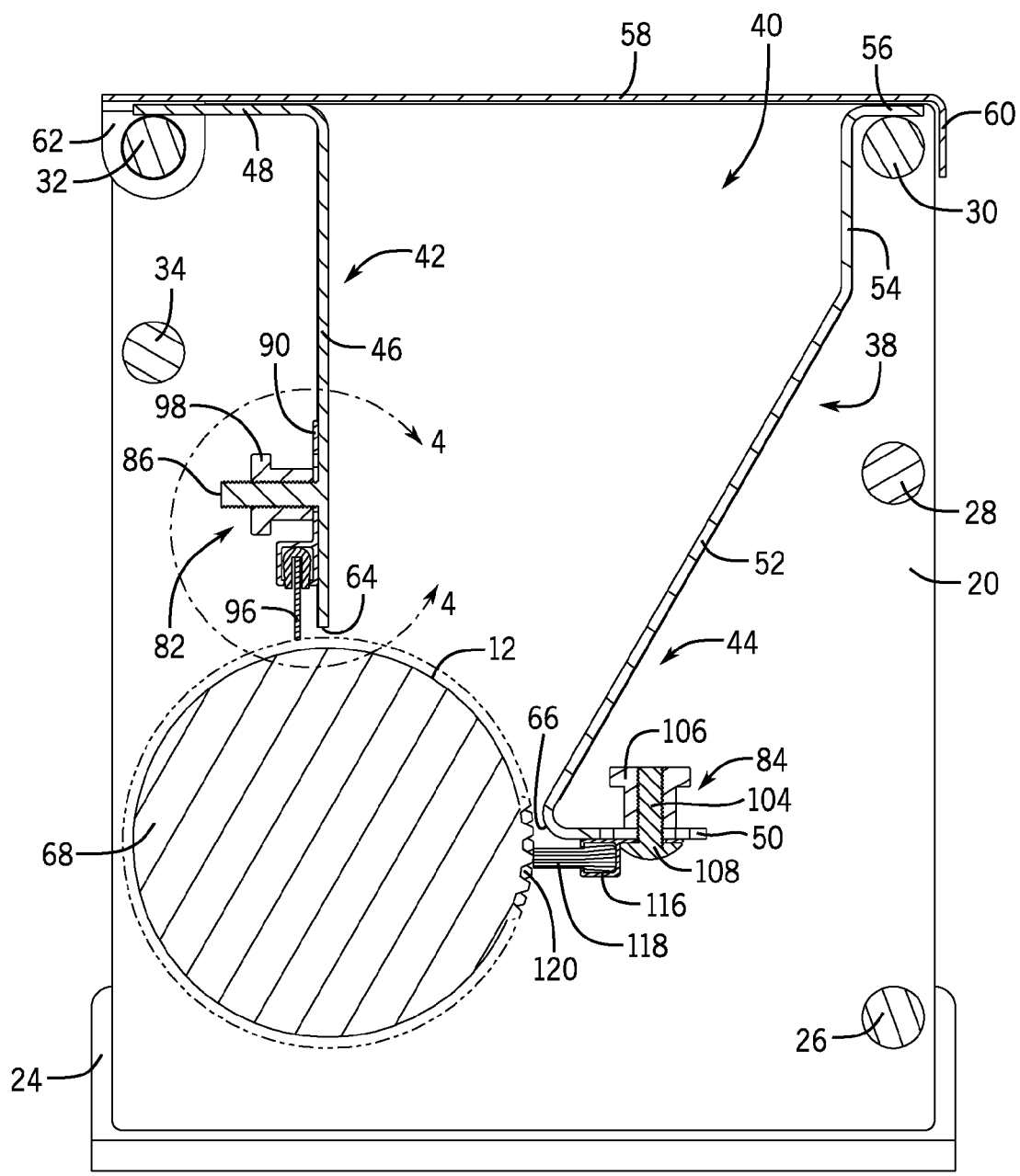
FIG. 3 is an enlarged sectional view taken on line 3-3 of FIG. 2 illustrating a covered hopper and several key operating components of the food topping dispenser.

As seen in FIGS. 1 and 2, the food topping dispenser 10 includes a pair of generally rectangular support walls 18, 20 which are maintained in an upright position upon a fixed support surface by a pair of mounting brackets 22, 24 designed to be connected thereto. The fixed support surface in the example shown can be the stationary frame associated with the moving conveyor surface 16. The support walls 18, 20 are held spaced apart by a set of transversely extending tie rods 26, 28, 30, 32, 34 as best shown in FIG. 3. Outer ends of the tie rod 26 are configured to receive and retain threaded fasteners (one being shown at 27 in FIG. 2) which are passed through vertical legs of the mounting brackets 22, 24 at the front of the dispenser 10. Outer ends of the tie rods 28, 30, 32, 34 also receive and retain threaded fasteners, such as shown at 35, which are passed through the support walls 18, 20. Other threaded fasteners, such as shown at 36 in FIG. 1, are passed through vertical legs of the mounting brackets 22, 24 at the rear ends thereof, and are threaded directly into the support walls 18, 20. Horizontal legs of the mounting brackets 22, 24 are formed with apertures 37 designed to receive other fasteners to be secured in the fixed support surface.

The food topping dispenser 10 also includes an open top hopper 38 for receiving the food topping 12 to be dispensed. The hopper 38 has an open unobstructed interior 40 defined by a generally L-shaped back wall 42 and a bent front wall 44 which slopes inwardly towards the back wall 42, and has a fixed length which is longer than and extends below the back wall 42. The back wall 42 and the front wall 44 extend tightly between inner surfaces of the support walls 18, 20 which effectively form sidewalls of the hopper 38. As shown in FIG. 3, the back wall 42 and the front wall 44 lie between front and rear edges of the support walls 18, 20. Referring to FIG. 3, the back wall 42 has a generally vertically extending wall portion 46, and a rearwardly bent horizontally extending wall portion 48 which is securely supported upon the tie rod 32. The front wall 44 is configured with a forwardly extending lower end 50 which is bent upwardly and forwardly from a back end at an angle of about 60 degrees into an angled wall portion 52. The angled wall portion 52 is then bent at an upper end thereof into a vertically extending wall portion 54 and a forwardly extending upper end 56 which is firmly supported upon the tie rod 30. It should be appreciated that the back wall 42 and the sloping front wall 44 are rigidly suspended from the tie rods 30, 32. It should be further appreciated that the hopper 38, due to the size and shape of the back wall 42 and the front wall 44, promotes the free flow of food topping 12 from the unobstructed interior 40 as will be better described below.

A flat cover plate 58 having a downwardly bent front edge 60 is pivotally mounted over the open top hopper 38 by means of pivot ears (one being seen at 62) which are rotatably supported about the tie rod 32 at the rear of the dispenser 10. The cover plate 58 is movable from an open position (FIG. 1) allowing access to the interior 40 of hopper 38 to a closed position (FIG. 2) closing off the interior 40. The front edge 60 extends downwardly over the front upper ends of the support walls 18, 20, and can be used to move the cover plate 58 between the open and closed positions. Food topping 12 can be either manually or automatically loaded into the hopper 38.

Figure 6:
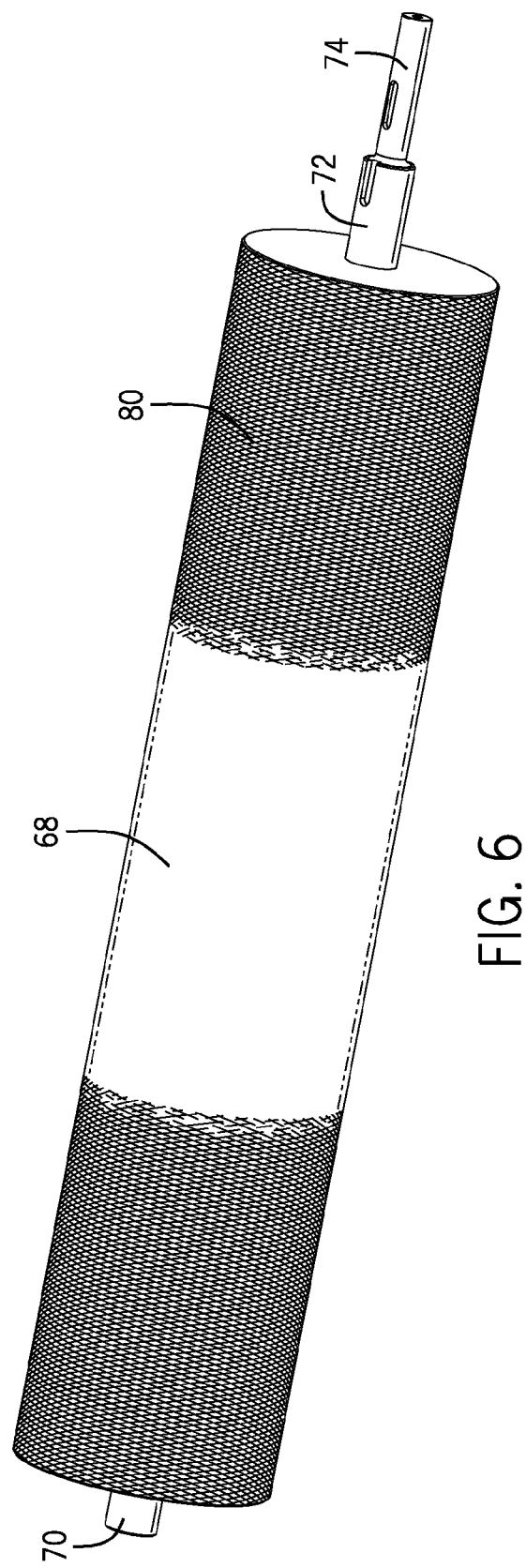
FIG. 6 is a perspective view of the application roller.

When food topping 12 is received in the hopper 38, the force of gravity forces the food topping 12 to exit the hopper 38 via a discharge opening defined by a lower end 64 of the back wall 42 and a lower end 66 of the sloping front wall 44. Occupying and positioned in the discharge opening along its entire length is a portion of a cylindrical application roller 68 which extends and is mounted for rotation between the support walls 18, 20. More particularly, a 90-degree sector of the application roller 68 lies between the tower end 64 of back wait 42 and the lower end 66 of front wall 44. As seen in FIG. 6, the application roller 68 has opposite ends 70, 72 which are rotatably received in the support walls 18, 20. The end 72 includes a stub shaft 74 which is drivingly received and retained in a gear box 76 operatively driven by an electric motor 78. The gear box 76 and the motor 78 are secured to the mounting bracket 22, and form a driving arrangement for selectively driving and rotating the application roller 68. The entire peripheral or exterior surface of the application roller 68 is constructed with a diamond knurled configuration 80 to provide a number of uniformly spaced pockets for receipt of food topping 12 from the hopper 38. In the example shown, the configuration 80 is preferably a 14-point full pitch diamond knurl which defines pockets desirably shaped and sized to hold fine granular material such as flour, powdered sugar and the like. Although such construction is preferable, it should be understood that other surface configurations 80 of application roller 68 may be provided as desired.

To effect positive removal of food topping material 12 dispensed from the hopper 38 onto the knurled application roller 68, the dispenser 10 further includes an adjustable wiper arrangement 82 and an adjustable stripping brush arrangement 84.

Figure 4:
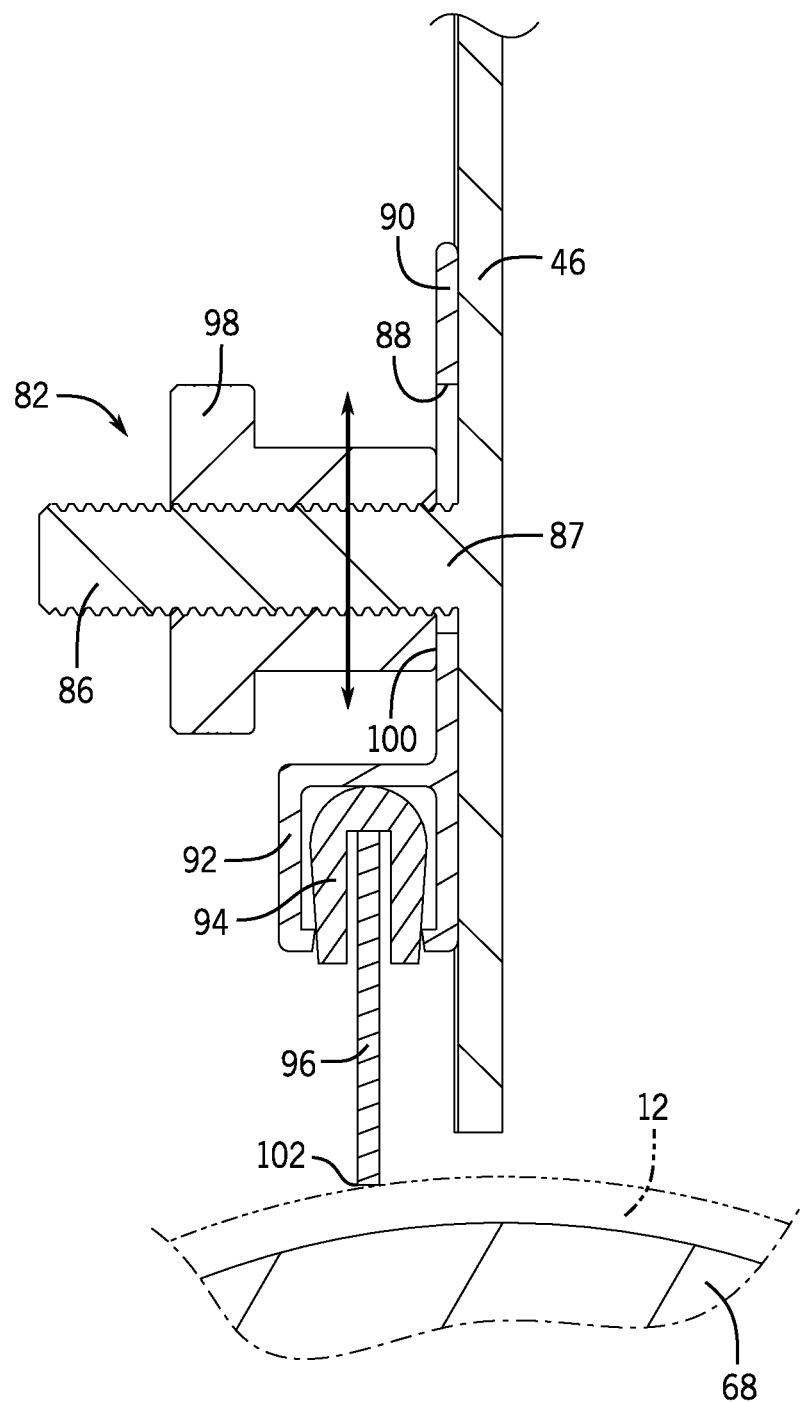
FIG. 4 is an enlarged detail view taken on line 4-4 of FIG. 3 illustrating a wiper arrangement of the food topping dispenser.

Referring now to FIGS. 3 and 4, the wiper arrangement 82 is used to control the thickness and flow of the food topping 12 deposited from the hopper 38 on the knurled configuration 80 of the application roller 68. The wiper arrangement 82 is adjustably mounted relative to an upwardly facing portion of the application roller 68 on a lower end of the vertically extending wall portion 46 of the back wall 42. The wiper arrangement 82 includes a pair of spaced threaded studs 86, each of which is rigidly connected at an inner end 87 to the wall portion 46, and extends through a slot 88 formed in an adjustment plate 90 slidably engaged against an outer surface of the wall portion 46. The adjustment plate 90 has a retainer 92 provided on a bottom end thereof for frictionally retaining an inverted U-shaped member 94 having an elongated vertically extending wiper element 96 depending therefrom. In the exemplary embodiment shown, the wiper element 96 is preferably constructed of UHMW polyethylene or other plastic material although other suitable materials may be used. The member 94 and the wiper element 96 are removably mounted in the retainer 92. An adjustment knob 98 is threadably adjustable on each threaded shaft 86 to move an inner end 100 of knob 98 into and out of clamping engagement with an outer surface of the adjustment plate 90. In FIG. 4, the ends 100 of adjustment knobs 98 are sufficiently tightened so that a lower end 102 of wiper element 96 engages van outermost surface of the food topping 12 at a desired setting along the entire length of the application roller 68. Tightening and loosening the adjustment knobs 98 relative to the studs 86 allows the adjustment plate 90 and the wiper element 96 to be vertically adjusted relative to the roller 68 up and down as depicted by the arrows between the upper and lower limits of the wall formation defining the slot 88. The wiper element 96 is continuously positioned above the application roller 68.

Figure 5:
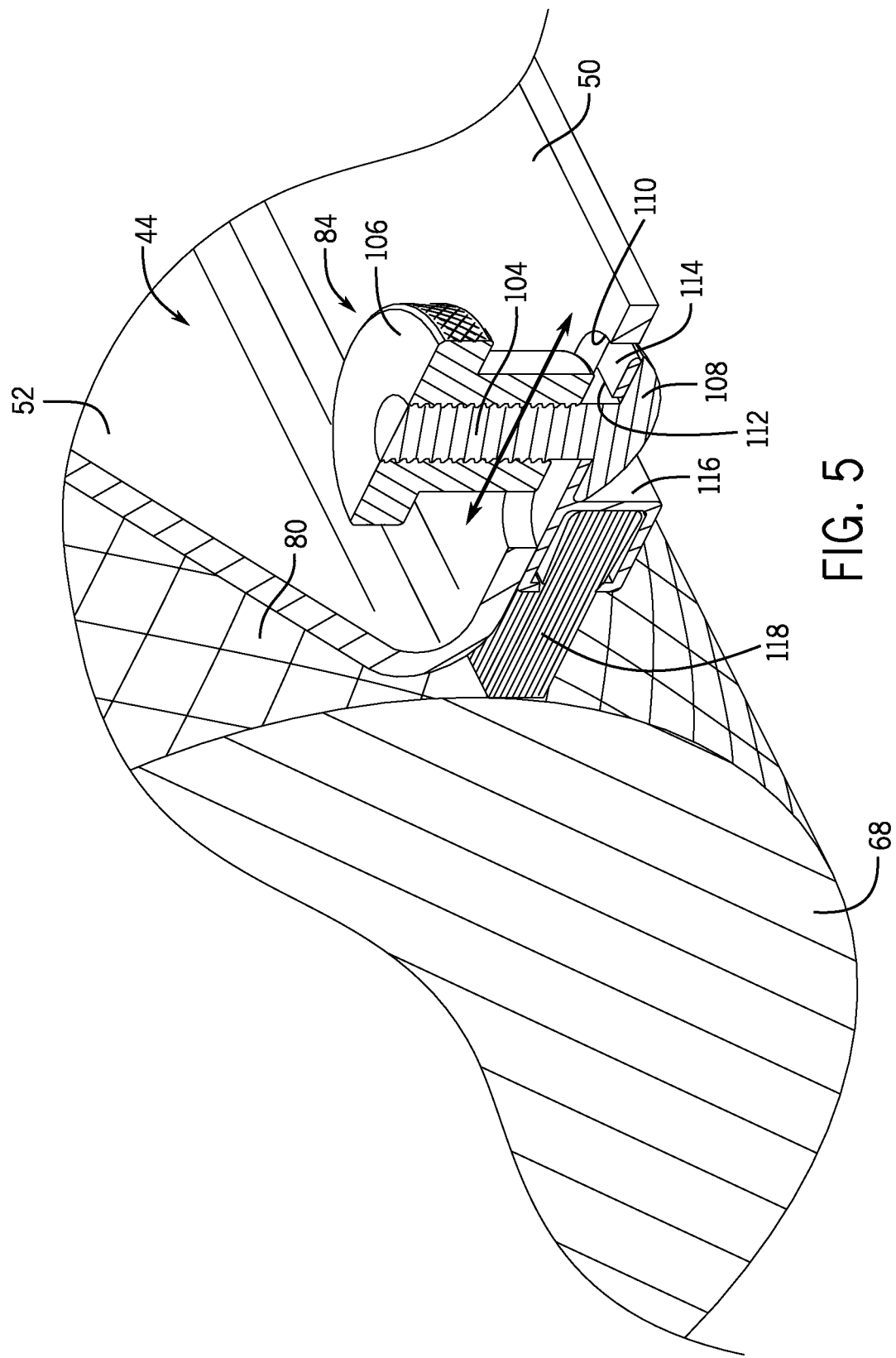
FIG. 5 is an enlarged detail view in partial cross section of a stripping brush arrangement and an application roller for the food topping dispenser.

Referring now to FIGS. 2, 3 and 5, the stripping brush arrangement 84 functions to strip and clear the food topping material 12 from the rotating application roller 68 along its entire length thus providing a uniform veiled pattern of food topping 12 to be deposited on the food products 14 passing beneath the dispenser 10.

The stripping brush arrangement 84 is adjustably mounted relative to a forwardly facing portion of the application roller 68 at the lower forwardly extending end 50 of the front wall 44. The stripping brush arrangement 84 includes a pair of spaced apart threaded studs 104, each of which is threadably received in an adjustment knob 106. Each threaded stud 104 has a head 108 and extends through an elongated slot 110 formed in the wall end 50, and a hole 112 formed in an adjustment plate 114 slidably mounted along a lower surface of the wall end 50. The adjustment plate 114 has a retainer 116 provided on a rear end thereof for retaining a stripping brush element 118 extending therefrom. In the example shown, the stripping brush element 118 is provided with nylon bristles, but it should be understood that other bristle material may be used as desired. The stripping brush element 118 is designed to be continuously engaged with the food topping 12 deposited in the knurled configuration 80 of the application roller 68 along the entire length thereof.

As shown in FIG. 5, each knob 106 and stud 104 are tightened together so that the head 108 of stud 104 is securely engaged against the bottom surface of adjustment plate 114 with a force which holds the adjustment plate 114 and the stripping brush element 118 at a desired setting along the entire length of the application roller 68. Tightening and loosening the adjustment knobs 106 relative to the studs 104 allows the adjustment plate 114 and stripping brush element 118 to be adjusted back and forth in the direction of the arrows between the front and rear limits of the wall formation defining the slots 110.

In use, the wiper arrangement 82 and the stripping brush arrangement 84 are positioned in desired settings to place the wiper element 96 and the stripping brash element 118 in continuous engagement with food topping 12 in the hopper 38 that falls by gravity aided and directed by the sloping front wall 52 upon an upper forward facing 90-degree sector of the application roller 68 into pockets formed by the knurled configuration 80 on the external surface of the roller 68. Counterclockwise rotation of roller 68, as shown by the arrow in FIG. 3, is caused by selective energization of the motor 78 and gear box 76. Food topping 12 deposited from the hopper 38 through the discharge opening defined between the lower end 64 of back wall 42 and the lower end 66 of front wall 44 is received and retained in the pockets of the knurled configuration 80 of the rotating application roller 68. Since the roller 68 is rotating away from the angled front wall 52, the food topping 12 rotates away from the lowest vertical position at the nip between the front wall 52 and the roller 68. The food topping 12 is directed toward the vertical wall 46 which strips excess food topping away from the roller 68. The thickness of the food topping 12 held in the pockets of the application roller is regulated by the wiper element 96.

The outer diameter of the roller 68 is selected such that the food topping 12 remains on the outer surface of the application roller as the roller 68 rotates from the wiper element 96 toward the stripping brush element 118. In the embodiment illustrated, the roller 68 has an outer diameter of 5". During design and testing, it was determined that the outer diameter of the roller 68 should be at least 4.5" when the roller is used to distribute flour. The 5" outer diameter also is effective at delivering other types of food products, such as powdered sugar.

When the food topping contained on the roller 68 reaches the stripping brush element 118, the food topping 12 is subsequently delivered onto the food product during roller rotation past the stripping brush element 118. The stripping brush element 118 serves to uniformly clear and clean the material 12 from the application roller 68 along the entire length thereof to provide a vertically descending veil of food topping at 120 onto the food products 14 passing beneath in a highly accurate and consistent pattern and flow.

Figure 7:
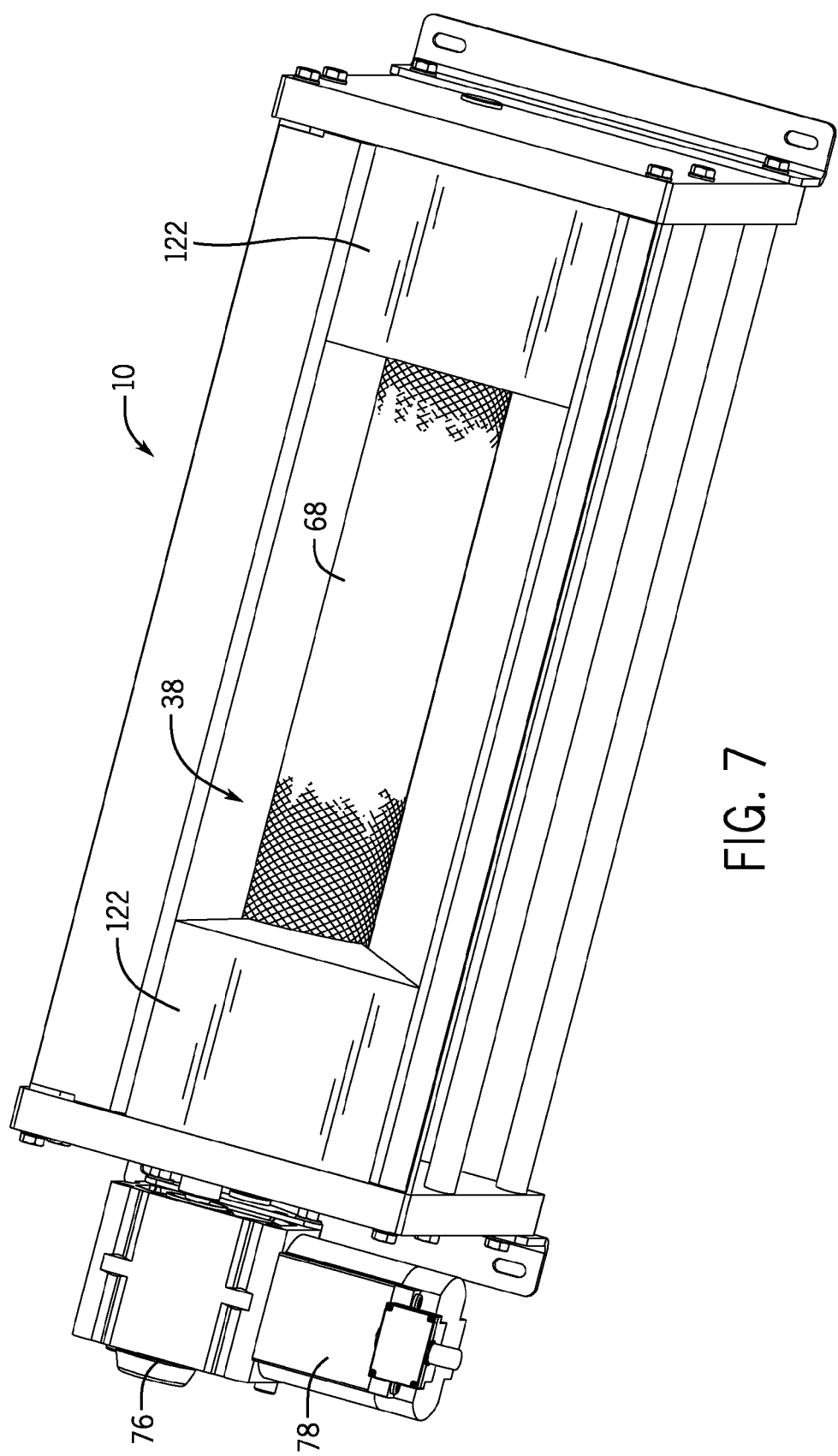
FIG. 7 is a top view of the food topping dispenser shown in FIG. 2 with the hopper cover removed and showing the hopper volume adjusted.

The food topping dispenser 10 of the present disclosure thus provides an improved sprinkling or dusting of food products with less working of the food topping required than in prior devices. That is, no agitation of food topping 12 in the hopper 38 is necessary so that no paddles, augers, arms or other moving parts are needed internally in the hopper nor is vibration required to provide a desirable food dusting. As a result, the dispenser 10 is less costly to manufacture with only a small number of operating components being necessary and a minimum of maintenance labor required. When the motor 78 and the gear box 76 are de-energized, the dusting of material 12 is immediately terminated so that leakage and waste of the food topping 12 is eliminated. The present disclosure contemplates that the volume of the hopper 38 could be lessened such as by adding space filling elements 122 on opposite sides of the hopper 38, such as depicted in FIG. 7, and modifying the application roller 68, wiper arrangement 82 and stripping brush arrangement 84 as necessary.

The present disclosure further contemplates that different sizes and types of hoppers, application rollers, wiper elements and stripping brushes may be utilized depending upon the particular type of food topping to be dispensed and the application desired.

What is claimed is:
1. A food topping dispenser for distributing a food topping on a food product comprising:
 a hopper including a pair of sidewalls, a back wall and a front wall defining an open unobstructed interior sized to receive a supply of food topping, lower ends of the back wall and the front wall defining a discharge opening;

an application roller positioned in the discharge opening and rotatably mounted in and between the sidewalls, the application roller having a closed peripheral surface configured exteriorly thereon to receive and retain the food topping from the discharge opening;

a wiper element mounted on the lower end of the back wall outside the open unobstructed interior and the discharge opening, and continuously positioned above the application roller for engagement with the food topping received from the discharge opening upon the application roller, the wiper element being configured to control a thickness of the food topping received and retained on the closed peripheral surface outside the discharge opening; and a stripping brush element adjustably mounted below the wiper element on the lower end of the front wall outside the open unobstructed interior and the discharge opening and configured for continuous engagement with the closed peripheral surface of the application roller for removing food topping retained therein, wherein the closed peripheral surface of the application roller is configured to retain the food topping thereon between the wiper element and the stripping brush element upon rotation of the application roller and wherein the stripping brush element removes the food topping from the application roller along an entire length thereof to dispense the food topping onto the food product.

2. The food topping dispenser of claim 1, wherein a 90-degree sector of the application roller lies between lower ends of the back wall and the front wall.

3. The food topping dispenser of claim 1, wherein the back wall and the front wall extend between the sidewalls, and are positioned in suspended relationship spaced from front and rear edges of the sidewalls.

4. The food topping dispenser of claim 1, wherein the back wall has an L-shaped configuration and includes a vertically extending wall portion that defines a portion of the discharge opening.

5. The food topping dispenser of claim 1, wherein the front wall has a forwardly extending lower end, an angled wall portion bent upwardly and forwardly on the forwardly extending lower end, a vertically extending portion joined to the angled wall portion and a forwardly extending upper end bent from the vertically extending portion.

6. A food topping device for dispensing a food topping onto a food product comprising:

a hopper including a pair of sidewalls, a back wall and a front wall sloping inwardly towards and extending beneath the back wall, the sidewalls, the back wall and the front wall defining an open unobstructed interior sized to receive a supply of food topping, and lower ends of the back wall and the front wall defining a discharge opening;

an application roller positioned in the discharge opening and rotatably mounted in and between the sidewalls, the application roller having a closed peripheral surface configured exteriorly thereon to receive and retain the food topping from the discharge opening;

a vertically extending wiper element mounted on the lower end of the back wall outside the open unobstructed interior and the discharge opening of the hopper, and engaged with the food topping received from the discharge opening upon the application roller, the wiper element being continuously positioned over the application roller and configured to control a thickness of the food topping received and retained on the closed peripheral surface outside the discharge opening; and a stripping brush element adjustably mounted below the wiper element on a lower end of a front wall outside the open unobstructed interior and the discharge opening of the hopper, and configured for continuous engagement with the closed peripheral surface of the application roller for removing food topping retained therein, wherein the closed peripheral surface of the application roller is configured to retain the food topping thereon between the wiper element and the stripping brush element upon rotation of the application roller and wherein the stripping brush element removes the food topping from the application roller along an entire length thereof to dispense the food topping onto the food product.

7. The food topping device of claim 6, wherein the front wall has a fixed length which is longer than a fixed length of the back wall.

8. The food topping device of claim 7, wherein the lower end of the front wall extends beneath the lower end of the back wall.

9. The food topping device of claim 8, wherein a 90-degree sector of the application roller is located between the lower end of the back wall and the lower end of the front wall.

10. The food topping device of claim 6, wherein the sidewalls are held spaced apart by a series of tie rods.

11. The food topping device of claim 6, wherein the back wall has an L-shaped configuration and includes a vertically extending wall portion that defines a portion of the discharge opening.

12. The food topping device of claim 11, wherein a horizontally extending wall portion is supported upon a first tie rod extending between the sidewalls at a rear end thereof.

13. The food topping device of claim 11, wherein the wiper element is adjustably mounted relative to the application roller on an outer surface of the vertically extending wall portion.

14. The food topping device of claim 6, wherein the front wall has a forwardly extending lower end, an angled wall portion bent upwardly and forwardly on the forwardly extending lower end, a vertically extending portion joined to the angled wall portion and a forwardly extending upper end bent from the vertically extending portion.

15. The food topping device of claim 14, wherein the angled wall portion is bent relative to the forwardly extending lower end at an angle of 60 degrees.

16. The food topping device of claim 14, wherein the forwardly extending upper end of the front wall is supported upon a second tie rod extending between the sidewalls at a front end thereof.

17. The food topping device of claim 16, wherein the stripping brush element is adjustably mounted relative to the application roller on the forwardly extending lower end of the front wall.

18. The food topping device of claim 6, wherein a volume of the hopper is adjusted by a space filling structure attached inside the hopper.

19. The food topping device of claim 6, wherein the closed peripheral surface of the application roller is formed with a 14-point full pitch diamond knurled configuration.

20. The food topping device of claim 6, wherein the sidewalls are positioned on opposite sides of the application roller and are mounted substantially perpendicularly to a support surface for a conveyor arrangement on which the food product is conveyed.

* * * * *